United States Patent [19]

Nagel

[11] Patent Number: 5,776,294
[45] Date of Patent: Jul. 7, 1998

[54] PEROXIDE-CURED ELASTOMERS WITH IMPROVED METAL ADHESION

[75] Inventor: Walter R. Nagel, West Chester, Pa.

[73] Assignee: Sartomer Company, Exton, Pa.

[21] Appl. No.: 874,097

[22] Filed: Jun. 12, 1997

Related U.S. Application Data

[63] Continuation of Ser. No. 882,464, May 13, 1992, abandoned.

[51] Int. Cl.⁶ .............................. B32B 31/00; C08J 5/00
[52] U.S. Cl. ................................................ 156/307.7
[58] Field of Search ...................... 156/307.7, 307.1, 156/307.3

[56] References Cited

U.S. PATENT DOCUMENTS 3,970,722  7/1976  Ogihara.

*Primary Examiner*—Christopher Henderson
*Attorney, Agent, or Firm*—James A. Drobile; Michael B. Fein

[57] ABSTRACT

A method of providing curable elastomers crosslinked with the aid of metal salts of $\alpha,\beta$-ethylenically unsaturated carboxylic acids and, optionally an alkyl aminoalkyl phenol vulcanization inhibitor, having improved adhesive properties is provided. The method of the invention yields cured rubber articles with markedly improved adhesion to metals and synthetic fibers, curable and cured elastomers prepared by the method, and articles comprising at least one polar surface and an adhering cured elastomer, are also provided.

33 Claims, No Drawings

PEROXIDE-CURED ELASTOMERS WITH IMPROVED METAL ADHESION

This application is a continuation of application Ser. No. 07/882,464 filed May 13, 1992 which application is now abandoned.

FIELD OF INVENTION

This invention relates to a method for improving the adhesive properties of elastomers through the use of metal salts of α,β-ethylenically unsaturated carboxylic acids as crosslinking agents and, in particular, to a method for improving the adhesion of peroxide-cured elastomers to metals and synthetic fibers in which vulcanization is accomplished with an organic peroxide and a metal salt of an acrylic or methacrylic acid coagent. The invention also relates to curable and cured elastomers so prepared, and to articles comprising at least one polar surface and an adhering cured elastomer of the type described.

STATEMENT OF RELATED ART

Cured elastomer compositions typically adhere poorly to most polar surfaces. Methods and systems for improving elastomer-metal adhesion and elastomer-fiber adhesion are generally known in the art as illustrated by the following patents.

U.S. Pat. No. 4,137,359 to Bak et al. relates to vulcanizable elastomeric compositions having improved adhesion to metal surfaces, comprising an elastomer containing a small amount of mixed metal salts wherein at least one metal is an oxidizing constituent and one metal is either a polymerizing constituent or calcium.

U.S. Pat. No. 4,154,911 to Bak et al. relates to vulcanizable elastomeric compositions having improved adhesion to brass plated surfaces, comprising an elastomer containing a small amount of copper and zinc salts.

U.S. Pat. No. 3,514,370 to Canevari relates to vulcanizable elastomeric compositions having improved adhesion to metal surfaces, comprising elastomers containing cobalt salts of an organic carboxylic acid in combination with sulfur.

U.S. Pat. No. 3,991,130 to Cowell et al. relates to vulcanizable elastomers in which organo-nickel salts are utilized as adhesion promoters.

U.S. Pat. No. 3,847,583 to Bellamy relates to vulcanizable elastomers with improved metal adhesion which comprise a rubber stock containing an adhesive resin forming system into which a cobalt salt is incorporated.

Resorcinol-aldehyde based additives that improve elastomer adhesion to metals are disclosed in U.S. Pat. No. 3,847,727 to Kindle et al., U.S. Pat. No. 3,862,883 to Cantor, and U.S. Pat. No. 3,517,722 to Endter et al. Resorcinol based additives that improve elastomer adhesion to fiber are disclosed in U.S. Pat. No. 3,256,137 to Danielson and U.S. Pat. No. 3,266,970 to Paul.

Additionally, curable elastomer compositions having improved physical properties which contain various rubbery elastomer polymers and certain α,β-ethylenically unsaturated carboxylic acids are generally known in the art.

For example, golf ball compositions employing butadiene, styrenebutadiene, isoprene, transpolyisoprene and ionomeric resins, fine inorganic fibers treated with a specified surface treating agent prior to mixing with the elastomers, and which optionally contain crosslinking monomers are disclosed in U.S. Pat. No. 4,955,966 to Yuki et al.

U.S. Pat. No. 4,720,536 to Roland et al. discloses curable rubber compositions having high modulus comprising a natural rubber, neoprene, a nitrile rubber with a metal dimethacrylate.

U.S. Pat. No. 4,713,409 to Hayes et al. relates to vulcanizable polymeric compositions having improved strength and hysteresis properties comprising rubbery polymers and zinc dimethacrylate.

A golf ball comprising a core formed of a thermally crosslinked composition of polybutadiene rubber, acrylic or methacrylic acid, and an ester are disclosed in U.S. Pat. No. 4,483,537 to Hanada et al.

Golf balls having improved properties are described in U.S. Pat. No. 4,056,261 to Pollitt et al. which relates to a composition of cis-polybutadiene and a metal crosslinking monomer.

U.S. Pat. No. 4,770,422 to Isaac relates to a golf ball composition comprising polybutadiene crosslinked by zinc diacrylate.

U.S. Pat. No. 4,929,678 to Hamada et al. discloses a rubber composition for a golf ball comprising a polybutadiene and a co-crosslinking agent encompassing an unsaturated carboxylic acid and metal salts thereof.

U.S. Pat. No. 3,970,722 to Ogihara et al. relates to a modified crystalline propylene polymer prepared with a modifying agent, the modifying agent being a metal salt of acrylic or methacrylic acid.

This invention relates to a method for improving the adhesion of elastomers to polar surfaces through the utilization of a metal salt of an acrylic or methacrylic acid as a vulcanization coagent. The cured elastomers exhibit improved adhesion to metals and synthetic fibers.

SUMMARY OF THE INVENTION

An object of the present invention is to provide a method of providing curable elastomer compositions which produces cured elastomers having good adhesion to polar surfaces, such as metals and nylon fiber.

Another object of the present invention is to provide an improved curable composition and a resulting cured elastomer having good adhesion to metals and nylon fiber comprising an elastomer crosslinked with a metal salt of an α,β-ethylenically unsaturated carboxylic acid crosslinking coagent.

A further object is to provide articles comprising at least one polar surface and an adhering cured elastomer in which the adhesion between the polar surface and the cured elastomer is unexpectedly improved.

The foregoing objectives are achieved in one aspect of the invention in which an elastomer is crosslinked with the aid of a metal di(meth)acrylate coagent to yield a cured polymer having markedly improved adhesion to metals and synthetic fibers over other prior art compositions employing different crosslinking agents.

Accordingly, the present invention pertains, among other things, to a method for providing curable elastomers, and cured elastomers having improved adhesive properties with respect to polar surfaces, and resulting articles, by:

(a) preparing a curable elastomer composition comprising a curable elastomer and a metal salt of an α,β-ethylenically unsaturated carboxylic acid present in an amount from about 0.01 to about 100 parts, preferably from about 0.1 to about 20 parts, by weight per 100 parts by weight of the elastomer;

(b) applying the composition of step (a) to a polar surface; and (c) curing the composition while applied to the polar surface.

In another aspect, the invention pertains to curable and cured compositions produced by the method of preparing a blend comprising:

3

(a) a free radical curable elastomer capable of being vulcanized with a free radical generating compound;

(b) a metal salt of an acrylic or methacrylic acid present in an amount from about 0.01 to about 100 parts, preferably from about 0.1 to about 20 parts, by weight per 100 parts by weight of the elastomer; and (c) a free radical generating compound present in an amount from about 0.1 to about 15 parts, and preferably from about 0.5 to about 10 parts by weight per 100 parts by weight of the elastomer.

In another aspect of the invention, curable compositions and cured compositions produced by the method of curing compositions having improved scorch characteristics during a free radical curing process and improved adhesive properties are achieved utilizing a composition, consisting of:

(a) a free radical curable elastomer capable of being vulcanized with a free radical generating compound;

(b) a metal salt of acrylic or methacrylic acid present in an amount from about 0.01 to about 100 parts, and preferably, from about 0.1 to about 20 parts, by weight per 100 parts by weight of the elastomer;

(c) a free radical generating compound present in an amount from about 0.1 to about 15 parts, preferably, from about 0.5 to about 10 parts, by weight per 100 parts by weight of the elastomer; and (d) a vulcanization inhibitor corresponding to the formula:

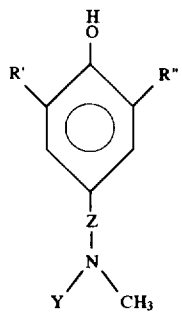

[Formula 1]

wherein R' and R" are each independently lower alkyl of from 1 to 6 carbon atoms, Z is an alkylene radical containing from 1 to 12 carbon atoms, and Y is a member selected from the group consisting of an alkyl, cycloalkyl, aryl, alkaryl and aralkyl radical, such radical containing from 1 to 12 carbon atoms (or a lower alkyl-substituted derivative of said aryl radicals containing from 1 to 6 carbon atoms in the alkyl chain), said inhibitor being present in an amount of from about 0.01 to about 5 parts, and preferably from about 0.1 to about 2 parts, by weight per 100 parts by weight of elastomer.

DESCRIPTION OF THE PREFERRED EMBODIMENTS

Elastomers

The term curable elastomer, as used herein, is intended to include, without limitation, the elastomeric organic high polymers including natural rubber and the various synthetic rubbers which cure, i.e., vulcanize or cross-link, with a free radical generating compound or by radiation cure. In general, these curable rubbers are polymers of conjugated dienes or polymers with easily abstractible hydrogen, wherein the monomers are linked through carbon-carbon bonds. Representative examples of synthetic rubbery polymers of conjugated dienes include: synthetic polyisoprene, styrenebutadiene rubbers, polybutadiene rubbers, butyl rubber, bromobutyl rubber, chlorobutyl rubber, the neoprenes, ethylene propylene rubbers, nitrile elastomers, silicone elastomers, thermoplastic elastomers, fluoroelastomers, high styrene butadiene copolymers, vinyl acetate ethylene copolymers, chlorinated polyethylene rubber, chlorosulfonated polyethylene elastomer, polyethylene and reclaimed rubber. All of these elastomers are commercially available.

These elastomers, as normally formulated and cured by either peroxide or sulfur vulcanization, adhere poorly to most polar surfaces. The term polar surfaces, as used herein, is intended to include without limitation, cold rolled steel, stainless steel, brass, zinc, aluminum, and synthetic fibers. The elastomers adhere poorly to these surfaces due to the absence of suitable polar bonding sites on the elastomer backbone.

It is known that these elastomers can be cured by a variety of methods including peroxide/coagent cure, radiation cure, sulfur, and thiadiazole cure. The present invention preferably utilizes a peroxide/coagent cure in which the use of an organic peroxide and the metal salts of certain α,β-ethylenically unsaturated carboxylic acids as coagents results in improved adhesion of the cured elastomers to polar surfaces. The elastomeric composition of the invention also exhibits improved adhesive properties when the other methods of cure are utilized.

Vulcanizing Agent

Vulcanizing agents that decompose to produce free radicals during the curing cycle may be employed as curing agents in the present invention. The free radical generating compound advantageously employed in the present invention is a ditertiary alkyl peroxide, dicumyl peroxide (DICUP™)).

Ditertiary peroxide curing compounds are generally preferred, which peroxides and their homologs and analogs, all correspond essentially to the structural formula shown in Formula 2 below:

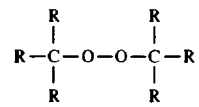

[Formula 2]

These ditertiary peroxide agents contain at least one peroxy group disposed between tertiary carbon atoms, which tertiary carbon atoms are linked to carbon atoms constituting portions of each of the R groups, which R groups may be alkyl (including straight, branched, or cyclic), alkenyl or aryl groups, or mixtures of such groups, and which R groups may be further substituted by non-hydrocarbon groups, for example, ethers, additional peroxy groups, or halogen, such as chlorine, and which organic peroxides do not interfere with either the curing process or the cured elastomeric product.

Illustrative organic peroxides include diacetyl peroxide, dibenzoyl peroxide, dicapryl peroxide, di-(p-chlorobenzoyl) peroxide, didecanoyl peroxide, di-(2,4--dichlorobenzoyl) peroxide, diisobutyl peroxide, diisonanoyl peroxide, dilauroyl peroxide, dipelargonyl peroxide, dipropynyl peroxide, di(β-carboxypropinoyl) peroxide, methyl ethyl ketone peroxide, cyclohexanone peroxide, dihydroxydimethyl-dioxacyclopentane, t-butyl peroxide, t-butyl peroxy(2-ethylhexanoate), t-butylperoxyisobutylate, O,O-t-butyl-O-isopropylmonoperoxy-carbonate, t-butylperoxypivalate, dimethyl-di(benzoylperoxy)-hexane, t-butyl-peroxy (2-ethylbutylate), di-t-butyl peroxide, dicumyl peroxide, 2, 5-bis(t-butylperoxy)-2,5-dimethylhexane, t-butyl hydroperoxide, cumyl hydroperoxide, α,α'-bis-- (t-butylperoxy) diisopropyl benzene, 1,1-di-t-butylperoxy-3,3,5-trimethylcyclohexane, and n-butyl-bis(t-butylperoxy)- valerate and the like. Among the foregoing free radical generating compounds mentioned above, dicumyl peroxide (DICUP™), 1,1-di-t-butylperoxy-3,3,5-trimethycyclohexane, di-t-butyl peroxide (both available from AKZO Chemicals, Inc. of Chicago, Ill.), 2,5-dimethyl-2,5-di|t-butylperoxy|-2 hexane (VAROX DBPH 50™), 2,5-dimethyl-2,5-di-t-butylperoxy-3-hexyne (LUPERSOL 130™), and α,α'-bis-(t-butylperoxy)-diisopropyl benzene (VULCUP R™) are commercially available and conveniently used. The foregoing organic peroxides may be used alone or in combinations.

The amount of free radical generating compound used in the present invention may be varied depending on the polymer and crosslinking coagent selected. Hence, the required amount of free radical-generating compound required to practice the present invention is a cure-effective amount readily ascertainable by one of ordinary skill in the art. Generally, an amount of from about 0.1 to about 15 parts by weight per hundred parts by weight of the elastomer is employed. Preferably, amounts of from about 0.5 to about 10 parts by weight per hundred parts by weight of the elastomer are used.

Coagents

The present invention is based on the unexpected discovery that metal salts of certain α,β-ethylenically unsaturated carboxylic acids, specifically the metal salts of acrylic and methacrylic acids, when used as crosslinking coagents in the process herein disclosed, yield cured elastomer compositions with markedly improved adhesive properties with respect to polar surfaces. Such results are surprising because it is well known that many elastomers, as normally formulated and cured, adhere poorly to polar surfaces.

Internal adhesion promoters are known to increase the adhesive properties of free radical curable elastomers. However, these promoters have only limited effectiveness with certain metal substrates. Although conventional crosslinking agents, such as trimethylolpropane triacrylate, increase the mechanical properties of elastomers, they have very little effect on adhesion. Therefore, it is surprising that, under similar conditions, the metal salts of acrylic and methacrylic acids greatly increase the adhesive properties of free radical curable elastomers with respect to a wide range of polar surfaces.

In the present invention, the metal salt of an acrylic or methacrylic acid coagent was advantageously employed with the elastomers herein to yield cured rubbers having markedly improved lap shear adhesion to cold rolled steel, stainless steel, brass, zinc, aluminum, and nylon fiber. This adhesion was significantly higher than that which resulted with the use of conventional crosslinking agents. Elastomers produced by the process of the present invention would have been expected to demonstrate equivalent adhesion to elastomers produced by processes in which conventional crosslinking agents were utilized. However, use of the metal salts of acrylic and methacrylic acids as crosslinking agents has resulted in an unexpected and surprising improvement of the adhesion of the elastomers to polar surfaces.

Examples of the metal component for those metal salts of acrylic and methacrylic acids include, without limitation, zinc, magnesium, sodium, potassium, calcium, barium, cobalt, copper, aluminum and iron. Zinc is particularly preferred because of its effectiveness and ease of manufacture. The metals may be incorporated into the composition by using the metal salts of the acrylic or methacrylic acids obtained by reacting the metal compound and the acrylic or methacrylic acid or by addition of the acrylic or methacrylic acid and the metal compound, i.e., metal oxide, metal hydroxide, metal carbonate and the like separately into the elastomer and reacting them in the mixture to form the metal salts of acrylic and methacrylic acids in situ.

The amount of the metal salt to be used as a cross-linking coagent in the present invention is not critical. Generally, amounts of from about 0.01 to about 100 parts by weight per 100 parts by weight of the elastomer may be used. Preferably, amounts of from about 0.1 to about 20 parts by weight per 100 parts by weight of the elastomer are used.

The metal salts employed in the present invention are dispersable in the polymer base. Preferably, zinc diacrylate is utilized.

Vulcanization Inhibitor

A modifier-retarder compound may be added to the composition in order to minimize scorching of the elastomer during free radical vulcanization of the composition. The use of certain alkyl aminoalkyl phenol as modifier-retarder agents, i.e., as vulcanization inhibitors, in a variety of elastomeric composition, has heretofore been taught in U.S. Pat. No. 4,857,571 which is incorporated herein by reference. The alkyl aminoalkyl phenol retarders effectively retard scorching of the cured elastomer and confer certain antioxidant properties, while eliminating many safety and efficacy concerns of the prior art scorch retardant compounds.

The alkyl aminoalkyl retarders that may advantageously be employed in the compositions of the present invention correspond to the following structural formula:

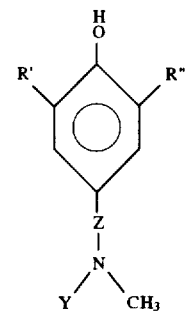

[Formula 3]

wherein R' and R" are each independently lower alkyl of from about 1 to 6 carbon atoms, Z is an alkylene radical containing from 1 to 12 carbon atoms, and Y is a member selected from the group consisting of an alkyl, cycloalkyl, aryl, alkaryl and aralkyl radical, such radical containing from 1 to 12 carbon atoms (or a lower alkyl-substituted derivative of said aryl radicals containing from 1 to 6 carbon atoms in the alkyl chain), said inhibitor being present in an amount of from about 0.01 to about 5 parts by weight per 100 parts by weight of elastomer.

Preferred retarders of the present invention are compounds conforming to the structural formula shown as Formula 3 above, wherein R' and R" are each tertiary alkyl hydrocarbons, Z is an alkylene radical containing from about 1 to 3 carbon atoms, i.e., methylene, ethylene and propylene radicals, and Y is a lower alkyl radical containing from 1 to 6 carbon atoms. A retarder employed in the present invention which is most preferred is 2,6-di-t-butyl-alpha-dimethylamino-p-cresol available as ETHANOX 703™ from Ethyl Corporation of Baton Rouge, La. It is further understood that mixtures of the foregoing retarders are within the scope of the present invention.

Additional representative compounds of the retarders that may be employed as retarders in the present invention include:

2,6-dimethyl-4-|methyl(ethyl)amino|methyl phenol
2,6-diethyl-4-|dimethylamino|methyl phenol
2,6-di-t-butyl-4-|dimethylamino|ethyl phenol
2,6-di-t-amyl-4|dimethylaminio|ethyl phenol 2,6-di-t-butyl-4-|methyl(cyclohexyl)amino|methyl phenol 2,6-di-t-butyl-4-|methyl(phenyl)amino|n-propyl phenol 2,6-di-t-amyl-4-|methyl(benzyl)amino|ethyl phenol 2,6-di-t-butyl-4-|methyl(4-t-butylphenyl)amino|n-butyl phenol 2,6-di-n-propyl-4-|methyl(4-t-butylbenzyl)amino|n-propyl phenol 2,6-di-t-butyl-4-|dimethylamino|n-hexyl phenol The modifier-retarder alkyl-substituted amino alkyl phenol compounds described herein may generally be added to the compositions of the present invention in amounts between about 0.01 to about 5 parts, preferably about 0.1 to 2 parts, by weight per 100 parts by weight of the elastomer to be cured.

Without departing from the scope of the present invention, and as appreciated by those skilled in the art, inert fillers may be included in the method and curable compositions of the invention. If an inert filler is desired, any known or conventional filler which does not interfere with the vulcanization process described herein may be used, and such fillers are desirable in finely divided form. Suitable fillers include, but are not limited to, the following: silica and silicates, thermal blacks (i.e., furnace, channel or lamp carbon black), clays, kaolin, diatomaceous earth, zinc oxide, cork, titania, cotton floc, cellulose floc, leather fiber, plastic fiber, plastic flour, leather flour, fibrous fillers such as glass and synthetic fibers, metal oxides and carbonates and talc. The amount of inert filler is dictated by its type and the intended end-use of the composition and, in general, may be less than about 30 parts by weight per 100 parts by weight of the elastomer and, more preferably, less than about 15 parts.

Other additives that may be added to the curable compositions of the present invention, depending upon the intended end-use of the cured rubber, include antioxidants, UV stabilizers, antiozonants, plasticizers, mold release agents, tackifiers, anti-tack agents, dispersants, solvents, softening agents, fatty acids such as stearic acid, processing aids, coloring agents and the like.

In the present invention, the aforementioned ingredients are mixed by any of the conventional means. Mixing may be accomplished by charging the ingredients to a Banbury mixer or a rubber mixing mill and intimately mixing the ingredients until the composition is uniform. The temperature of the mixing operation is not critical, but should be below temperatures at which the curing reaction commences. Generally, normal rubber milling practice is employed.

Thereafter, the unvulcanized composition is removed from the mill or mixer and can be applied to the polar surface according to the application. The mill may be used to size the composition to the proper thickness before curing and manually placing the composition between two polar surfaces to bond the surfaces together under pressure and heat. The composition can be bonded to a single polar surface by substituting an inert surface for one of the surfaces and applying pressure and heat. Polar surfaces may be imbedded in the unvulcanized composition by extruding around the polar materials. These polar surfaces serve as reinforcement for the cured elastomer.

Many rubber applications require the use of special adhesives to bond the elastomer to metal. For example, rubber roll manufacture requires application of an adhesive to the metal spindle prior to extruding the elastomer onto the spindle and subsequent build-up of the roll. In the present invention, the elastomer can be extruded onto the spindle and subsequently cured. Because the elastomer has improved adhesive properties, many rubber applications may be carried out in a conventional manner with the exception that the need for an application of an adhesive is eliminated.

Curing times, in general, range from about 1 to 30 minutes and preferably from about 5 to 15 minutes. Cure temperatures and pressures should be sufficient to melt or soften the reactants and to thermally decompose the free-radical generating compound. Thus, the selection of the cure temperature will be predicated upon the elastomer, coagent and free radical-generating compound that is selected. The temperatures useful in the present invention may vary between wide limits such as from 90° C. to 250° C. and preferably from 138° C. to about 215° C. For curing large rubber rolls, cure times of 24 hours are common to avoid stressing the roll.

The products prepared according to the present invention exhibit exceptional adhesion to metals and synthetic fibers. The compositions may be used in bonding metal parts together such that the final structure can withstand significant mechanical loading. Automotive reinforcement with synthetic fibers or steel belts may be improved by utilizing the present invention to eliminate the pretreatment and adhesives normally used because the tire elastomer will bond and adhere to the reinforcement.

Additional utilizations of the present invention include, but are not limited to, rubber rolls, wire and cable coatings in which the elastomer must adhere to the wire, automotive undercoatings, and plastisols containing the metal coagents utilized to coat a variety of surfaces.

The invention will be further clarified by a consideration of the following examples, which are intended to be purely exemplary of the use of the invention.

EXAMPLES

In the following Tables, all of the ingredients are expressed in parts by weight (unless otherwise noted) and each column corresponds to a number example.

Example 1

As a control formulation, a batch of ethylene propylene diene (EPDM) terpolymer, available as Nordel™ 1040, was masticated on a two roller mill until an acceptable bead was established in the conventional manner. Thereafter, for each 100 parts of EPDM, and in accordance with the recipe listed on Table 1, 100 parts of semi-reinforcing carbon black N-762, 50 parts of SUNPAR™ 2280 a proprietary plasticizier, 5 parts of zinc oxide, 1 part of stearic acid, 1 part of polymerized 1,2-dihydro-2,2,4-trimethylquinoline an antioxidant resin available as AGERITE™ RESIN D, and 7.5 parts of dicumyl peroxide available as the DICUP™ 40 KE, were added slowly to the flux roll and the band was cut and mixed until a uniform, smooth band was developed. Thereafter, the unvulcanized compound strip was cut and divided into three parts for curing in the compression molder for tensile testing, for curing between metal plates for lap shear adhesion testing, and for Oscillating Disc Rhemeter (ODR) testing for vulcanization characteristics.

Specimens of 25 mil thickness were compression molded and cured for 20 minutes at 160° C. and tested on a Thwing Albert tensile tester in accordance with ASTM D 412. Modulus values at 100 percent elongation were recorded in accordance with ASTM D 412. Shore A hardness values were obtained in accordance with ASTM D 1415. The results obtained may be found reported on Table 1.

The unvulcanized compound strip was gauged to about 0.030 inch with the two roller mill and cut into strips for the lap shear test. Standard metal strips 1×4 inches and about 0.030 inch thick were methanol washed and either overlapped by ½ inch or by 1 inch. The compound and overlapped metal strips were cured in the Chelesa mold for 20 minutes at 166° C. The specimen was then air cooled and tested on the Thewing Albert tensile tester in accordance with ASTM 816-55. The results obtained with this vulcanized test specimen may be found reported in Table 1. The tested metals include cold rolled steel, stainless steel, brass, zinc, and aluminum.

Vulcanization characteristics were determined with a Tech PRO ODR using a 1° arch. Vulcanization characteristics were determined at 166° C., the same temperatures used to vulcanize the lap shear specimen. Vulcanization characteristics that were measured include $TS_2$, TC (90) and maxmum torque (MHF) and test results are reported on Table 1.

Examples 2–12

Rubber compositions were produced by repeating the procedure of Example 1 except that the recipes for Examples 2–12, which may be found on Table 1, were followed.

Example 7 involved substitution of 10 parts of zinc diacrylate to the flux roll for the trimethylolpropane triacrylete of Example 2.

Examples 8 and 9 involved the substitution of an equal weight of zinc dimethacrylate and magnesium diacrylate, respectively for the zinc diacrylate of Example 7.

Example 10 involved the addition of 4.9 parts zinc diacrylate and 0.1 parts of ETHANOX™ 703. Example 11 involved increasing the amount of zinc diacrylate added to 9.8 parts and the amount of ETHANOX™ added to 0.2 parts. In Example 12, 19.6 parts of zinc diacrylate and 0.4 parts of ETHANOX™ 703 were added.

TABLE 1

| | EXAMPLE | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| EPDM[1] | 100 | 100 | 100 | 100 | 100 | 100 | 100 | 100 | 100 | 100 | 100 | 100 |
| CARBON BLACK | 100 | 100 | 100 | 100 | 100 | 100 | 100 | 100 | 100 | 100 | 100 | 100 |
| PLASTICIZER[2] | 50 | 50 | 50 | 50 | 50 | 50 | 50 | 50 | 50 | 50 | 50 | 50 |
| ZINC OXIDE | 5 | 5 | 5 | 5 | 5 | 5 | 5 | 5 | 5 | 5 | 5 | 5 |
| STEARIC ACID | 1 | 1 | 1 | 1 | 1 | 1 | 1 | 1 | 1 | 1 | 1 | 1 |
| ANTIOXIDANT RESIN[3] | 1 | 1 | 1 | 1 | 1 | 1 | 1 | 1 | 1 | 1 | 1 | 1 |
| DICUMYL PEROXIDE[4] | 7.5 | 7.5 | 7.5 | 7.5 | 7.5 | 7.5 | 7.5 | 7.5 | 7.5 | 7.5 | 7.5 | 7.5 |
| TMPTA[5] | | 9.8 | | | | | | | | | | |
| RICOBOND 1031[6] | | | 10 | | 20 | | | | | | | |
| RICOBOND 1731[7] | | | | 10 | | 20 | | | | | | |
| ZINC DIACRYLATE | | | | | | | 10 | | | 4.9 | 9.8 | 19.6 |
| ZINC DIMETHACRYLATE | | | | | | | | 10 | | | | |
| MAGNESIUM DIACRYLATE | | | | | | | | | 10 | | | |
| ETHANOX ™ 703[8] | | 0.2 | | | | | | | | 0.1 | 0.2 | 0.4 |
| SCORCH TIME TS-2, MIN | 3.0 | 1.4 | 2.9 | 2.8 | 2.9 | 3.4 | 1.3 | 1.4 | 1.7 | 1.3 | 1.4 | 1.4 |
| CURE TIME TC (90) MIN | 11.5 | 6.4 | 14.6 | 16.8 | 18.0 | 19.0 | 6.5 | 10.4 | 11.0 | 8.8 | 6.8 | 6.8 |
| CURE VISCOSITY, IN-LB | 7.4 | 14.1 | 11.0 | 12.5 | 12.4 | 12.8 | 16.3 | 12.4 | 13.7 | 13.6 | 16.8 | 21.6 |
| ADHESION, 330 F., 20 MIN | | | | | | | | | | | | |
| STEEL, MPa | 0.8 | 3.6 | 4.2 | 3.4 | 4.6 | 4.4 | 9.0 | 2.9 | 6.8 | 5.4 | 8.8 | 11.7 |
| STAINLESS, MPa | 0.4 | 1.7 | 4.5 | 5.3 | 4.9 | 4.4 | 9.3 | 6.3 | 6.5 | 6.5 | 9.1 | 10.1 |
| BRASS, MPa | 0.4 | 0 | 0.3 | 0.5 | 0.7 | 1.1 | 3.4 | 3.1 | 2.3 | 3.6 | 3.6 | 4.5 |
| ZINC, MPa | 0.3 | 1.0 | 1.1 | 2.5 | 4.4 | 3.2 | 7.9 | 3.6 | 5.8 | 5.8 | 5.9 | 7.9 |
| ALUMINUM, MPa | 0.3 | 0.6 | 1.8 | 1.3 | 3.1 | 3.0 | 2.9 | 3.1 | 2.1 | 3.1 | 4.2 | 4.5 |
| NYLON[9], LB | 3.5 | | | | | | 13.1 | | | | | |
| TENSILE PROPERTIES[10] | | | | | | | | | | | | |
| TENSILE STRENGTH, (PSI) | 700 | 1000 | 470 | 440 | 520 | 420 | 1030 | 1190 | 950 | 840 | 1240 | 1300 |
| ELONGATION, % | 1120 | 680 | 670 | 910 | 710 | 890 | 440 | 820 | 480 | 740 | 710 | 610 |
| MODULUS (100), (PSI) | 90 | 140 | 120 | 120 | 160 | 160 | 220 | 150 | 150 | 120 | 180 | 225 |
| HARDNESS, SHORE A[11] | 50 | 56 | 55 | 56 | 62 | 64 | 56 | 56 | 53 | 52 | 57 | 64 |

[1]Ethylene propylene diene terpolymer available as Nordel ™ 1040 from DuPont Company, Wilmington, Delaware.
[2]SUNPAR ™ 2280, a proprietary plasticizer available from Sun Refining and Marketing Company, Philadelphia, Pennsylvania.
[3]AGERITE ™ RESIN D, an antioxidant resin available from R. T. Vanderbilt Company, Inc., Norwalk, Connecticut.
[4]Available as DICUP ™ 4OKE from Hercules, Inc., Wilmington, Delaware.
[5]Trimethylolpropane trimethacrylate.
[6]Maleated liquid polybutadiene available from Advanced Resins, Grand Junction Colorado.
[7]Maleated liquid polybutadiene available from Advanced Resins, Grand Junction Colorado.
[8]2,6-di-t-butyl-alpha-dimethylamino-p-cresol, available from Ethyl Corporation, Baton Rouge, Louisiana.
[9]Pretreated 3350 Denier Nylon Fiber - Pull Through Tensile Test
[10]ASTM ™ D 412-87 Procedures.
[11]ASTM ™ D 1415 Procedure.

Example 2 involved the addition of 9.8 parts of trimethylopropane triacrylate and 0.2 parts of 2,6-di-t-butyl-alpha-dimethyl-amino-p-cresol, available as ETHANOXT™ 703, to the flux roll.

Example 3 involved the addition to 10 parts of maleated liquid polybutadiene, a commercial adhesion promoter available as Ricobond 1031, to the flux roll. In Example 4, an equivalent weight of RICOBOND™ 1731 was substituted for the RICOBOND™ 1031 of Example 3.

Example 5 involved the addition of 20 parts of RICOBOND™ 1031 to the flux roll. In Example 6, an equivalent weight of RICOBOND™ 1731 was substituted for the RICOBOND™ of Example 5.

As is apparent from the data reported on Table 1, use of a zinc or magnesium di(meth)acrylate coagent produced a marked increase in the adhesion for the peroxide-cured EPDM in Examples 7–12. This marked increase was neither seen in the control formulation of Example 1 nor the comparative formulations of Examples 2–6 in which either a conventional crosslinking agent or internal adhesion promoters were utilized.

The unexpected nature of the effect of the zinc and magnesium di(meth)acrylate coagents upon the adhesive properties of the present invention is demonstrated by the poorer adhesive properties resultant in Example 2 in which trimethylolpropane triacrylate was utilized as the crosslinking coagent. Similarly, the effect on the adhesive properties of the zinc and magnesium di(meth)acrylate coagents were superior to that of the adhesion promoters utilized in Examples 3–6.

Example 13

As a control formulation, a batch of silicone elastomer, available as GE 6140 from GE Silicone, was masticated on a two roller mill until an acceptable bead was established in the conventional manner. Thereafter, for each 100 parts of silicone elastomer, and in accordance with the recipe listed on Table 2, 1 part of a stabilizer available as GE 6916 HA, and 2 parts of 2,5-dimethyl-2,5-di[t-butylperoxy] hexane, a peroxide available as TRIGANOX™ 101-45, were added slowly to the flux roll and the band was cut and mixed until a uniform, smooth band was developed. As for Example 1, the strip was cut for curing and testing, the results of which tests are reported in Table 2.

Example 14

A rubber composition was produced by repeating the procedure of Example 13 except that 10 parts of zinc dracrylate was added to the flux roll.

Example 15

The procedure for Example 13 was repeated except that GE 6035, a silicone elastomer, was substituted for the GE 6140 silicone elastomer of Example 13. Additionally, 10 parts of zinc diacrylate was added to the flux roll.

As is apparent from Table 2, use of the zinc diacrylate coagent produced a marked improvement in the adhesion for the cured silicone elastomer in Example 14. Further, no change in the improved adhesion was seen when a different grade of silicone elastomer was utilized in Example 15.

TABLE 2

| Example | 13 | 14 | 15 |
|---|---|---|---|
| GE 6140[12] | 100 | 100 | |
| GE 6035[13] | | | 100 |
| Stabilizer[14] | 1 | 1 | 1 |
| Zinc Diacrylate | — | 10 | 10 |
| 2,5-dimethyl-2,5-di [t-butylperoxy] hexane | 2 | 2 | 2 |
| Adhesion, 330° F., 20 Min. | | | |
| Lap Shear (p.s.i.) | 77 | 483 | 510 |
| Steel, MPa | 0.5 | 3.3 | 3.5 |

[12]Silicone elastomer available from GE Silicone, Waterford, New York.
[13]Silicone elastomer available from GE Silicone, Waterford, New York.
[14]Available as GE 6916 HA from GE Silicone, Waterford, New York.

Example 16

A formulation of 25 parts GE 6140 silicone and 29 parts EPDM, as a control, was masticated on a two roller mill until an acceptable bead was established. Thereafter, 1.9 parts of GE 6916 HA stabilizer, 29 parts of N-762 carbon black, 15 parts of SUNPAR™ 2280, 1.5 parts of zinc oxide, 0.3 parts of stearic acid and 3.7 parts of TRIGANOX™ 101-45, were added to the flux roll. The band was cut and mixed until EL smooth band developed and, thereafter, cut and tested. The test results are reported on Table 3.

Example 17

The procedure of Example 16 was followed except that 18.5 parts of zinc diacrylate was added to the flux roll.

Use of the zinc diacrylate in the formulation of Example 17 produced a marked improvement in adhesive properties for the peroxide cured silicone/EPDM rubber mixture when compared to the formulation of Example 16.

TABLE 3

| Example | 16 | 17 |
|---|---|---|
| GE 6140 | 25 | 25 |
| EPDM | 29 | 29 |
| Stabilizer | 1.9 | 1.9 |
| Carbon Black | 29 | 29 |
| Plasticizier | 15 | 15 |
| Zinc Oxide | 1.5 | 1.5 |
| Stearic Acid | 0.3 | 0.3 |
| Zinc Diacrylate | — | 18.5 |
| 2,5-dimethyl-2,5-di [t-butylperoxy] hexane | 3.7 | 3.7 |
| Adhesion, 330° F. 20 min. | | |
| Lap Shear (p.s.i.) | 71 | 586 |
| Steal, MPa | 0.5 | 4.0 |

Other embodiments of the invention will be apparent to those skilled in the art from a consideration of this specification or practice of the invention disclosed herein. It is intended that the specification and examples be considered as exemplary only, with the true scope and spirit of the invention being indicated in the following claims.

What is claimed is:

1. A method for adhering an elastomeric composition to a polar surface, said method comprising the steps of:
    (a) preparing a curable elastomeric composition comprising a curable elastomer selected from the group consisting of synthetic polyisoprene, styrenebutadiene rubbers, polybutadiene rubbers, butyl rubber, bromobutyl rubber, cholorobutyl rubber, the neoprenes, ethylene propylene rubbers, nitrile elastomers, silicone elastomers, fluoroelastomers, high styrene butadiene copolymers, vinyl acetate ethylene copolymers, chlorinated polyethylene rubber, chlorosulfonated polyethylene elastomer, polyethylene, reclaimed rubber, and natural rubber; a metal salt of an α, β- ethylenically unsaturated carboxylic acid present in an amount between 0.01 to about 100 parts by weight per 100 parts by weight of the elastomer; and a cure-effective amount of an organic peroxide;
    (b) applying the curable elastomeric composition prepared in step (a) to a polar surface; and
    (c) curing the curable elastomeric composition while the curable elastomeric composition is applied to the polar surface.
2. The method of claim 1, wherein the metal salt is a metal salt of acrylic acid.
3. The method of claim 2, wherein the metal salt of acrylic acid is (a) zinc diacrylate; (b) magnesium diacrylate; or (c) aluminum acrylate.
4. The method of claim 3, wherein the metal salt of acrylic acid is zinc diacrylate.
5. The method of claim 3, wherein the metal salt is magnesium diacrylate.
6. The method of claim 1, wherein the metal salt is a metal salt of methacrylic acid.
7. The method of claim 6, wherein the metal salt is zinc dimethacrylate.
8. The method of claim 1, wherein the metal salt is present in an amount between about 0.1 to about 20 parts by weight per 100 parts by weight of the elastomer.
9. The method of claim 1, wherein the organic peroxide is present in an amount between about 0.1 to about 15 parts by weight per 100 parts by weight of the elastomer.

10. The method of claim 9, wherein the organic peroxide is a di-tertiary alkyl peroxide.

11. The method of claim 10, wherein the di-tertiary alkyl peroxide is dicumyl peroxide.

12. The method of claim 1, wherein the organic peroxide is present in an amount between about 0.5 to about 10 parts by weight per 100 parts by weight of the elastomer.

13. The method of claim 1, wherein the curing step comprises curing by a radiation cure.

14. The method of claim 1, wherein the curable elastomeric composition further comprises
a vulcanization inhibitor corresponding to the formula:

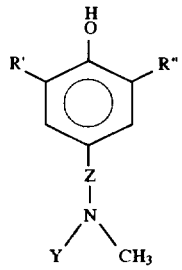

wherein R' and R" are each independently lower alkyl of about 1 to 6 carbon atoms, Z is an alkylene radical containing from 1 to 12 carbon atoms, and Y is a member selected from the group consisting of an alkyl, cycloalkyl, aryl, alkaryl and aralkyl radical, said radical containing from 1 to 12 carbon atoms and lower alkyl-substantial derivatives of said aryl radicals containing 1 to 6 carbon atoms, said inhibitor being present in an amount of between about 0.01 to about 5 parts by weight per 100 parts by weight of the elastomer.

15. The method of claim 14, wherein the elastomer is ethylene propylene diene elastomer, silicone elastomer, or mixtures thereof.

16. The method of claim 14, wherein the metal salt is a metal salt of acrylic acid.

17. The method of claim 16, wherein the metal salt is zinc diacrylate, magnesium diacrylate, or aluminum acrylate.

18. The method of claim 17, wherein the metal salt is zinc diacrylate.

19. The method of claim 17, wherein the metal salt is magnesium diacrylate.

20. The method of claim 14, wherein the metal salt is a metal salt of methacrylic acid.

21. The method of claim 20, wherein the metal salt is zinc dimethacrylate.

22. The method of claim 14, wherein the metal salt is present in an amount between about 0.1 to about 20 parts by weight per 100 parts by weight per 100 parts of the elastomer.

23. The method of claim 14, wherein the free radical generating compound is present in an amount between about 0.1 to about 15 parts by weight per 100 parts by weight of the elastomer.

24. The method of claim 1, wherein the organic peroxide is a di-tertiary alkyl peroxide.

25. The method of claim 24, wherein the di-tertiary alkyl peroxide is dicumyl peroxide.

26. The method of claim 23, wherein the metal salt of the α,β- ethylenically unsaturated carboxylic acid is present in an amount between about 0.1 to about 20 parts by weight per 100 parts by weight of the elastomer and the free radical generating compound is present in an amount between about 0.5 to about 10 parts by weight per 100 parts by weight of the elastomer.

27. The method of claim 14, wherein the curing step comprises curing by a radiation cure.

28. The method of claim 1, wherein the metal salt is a metal salt of methacrylic acid.

29. The method of claim 28, wherein the metal salt of methacrylic acid is zinc dimethacrylate.

30. The method of claim 1, wherein the elastomer is ethylene propylene diene elastomer, silicone elastomer, or mixtures thereof.

31. The method claim 30, wherein the elastomer is ethylene propylene diene elastomer.

32. The method of claim 30, wherein the elastomer is silicone elastomer.

33. The method of claim 31 wherein the metal salt of the α, β-ethylenically unsaturated carboxylic acid is zinc diacrylate and the organic peroxide is present in an amount between about 0.1 to about 15 parts by weight per 100 parts by weight of the ethylene propylene diene elastomer.

* * * * *